United States Patent [19]
Takeuchi et al.

[11] Patent Number: 5,980,673
[45] Date of Patent: Nov. 9, 1999

[54] WIPING SHEET AND METHOD FOR PRODUCING THE SAME

[75] Inventors: Naohito Takeuchi; Hiroki Gohda; Takayoshi Konishi; Kazuya Okada, all of Kagawa, Japan

[73] Assignee: Uni-Charm Corporation, Ehime, Japan

[21] Appl. No.: 09/034,731

[22] Filed: Mar. 4, 1998

[30] Foreign Application Priority Data

Mar. 10, 1997 [JP] Japan .................................. 9-055063
Mar. 10, 1997 [JP] Japan .................................. 9-055072

[51] Int. Cl.⁶ .................................. B31F 1/12; B31F 1/07; B31F 1/22; D21F 11/00
[52] U.S. Cl. .......................... 156/183; 156/209; 162/111; 162/113; 162/117
[58] Field of Search .................................. 156/183, 200, 156/204, 209, 219, 220; 162/111, 112, 113, 109, 206, 117, 134

[56] References Cited

U.S. PATENT DOCUMENTS

| | | | |
|---|---|---|---|
| 1,871,702 | 8/1932 | Kallander et al. | 156/183 X |
| 1,958,411 | 5/1934 | Alden | 162/112 |
| 2,522,857 | 9/1950 | Butler | 156/183 X |
| 2,996,425 | 8/1961 | Hamilton | 156/183 |
| 3,018,214 | 1/1962 | Waldie, Jr. et al. | 162/112 |
| 3,072,522 | 1/1963 | Hornbostel | 162/113 |
| 3,615,976 | 10/1971 | Endres et al. | 156/183 X |
| 3,650,882 | 3/1972 | Thomas | 156/209 X |
| 3,709,764 | 1/1973 | Thomas | 156/183 X |
| 3,953,638 | 4/1976 | Kemp | 156/183 X |
| 4,078,958 | 3/1978 | Patin | 156/183 |
| 4,440,597 | 4/1984 | Wells et al. | 162/111 |
| 4,469,735 | 9/1984 | Trokhan | 428/154 |
| 4,487,795 | 12/1984 | Lloyd et al. | 156/183 X |
| 5,466,318 | 11/1995 | Bjork | 156/183 |

FOREIGN PATENT DOCUMENTS 1212473  11/1970  United Kingdom ............... 162/109 X

*Primary Examiner*—Richard Crispino
*Assistant Examiner*—Sue A. Purvis
*Attorney, Agent, or Firm*—Koda & Androlia

[57] ABSTRACT

After laminating together the first sheets crepe-processed at a high crepe ratio and the second sheet crepe-processed at a crepe ratio lower than that of the first sheet or not crepe-processed, the sheets are bonded together at bonding parts at a given pitch in rows. When the resulting bonded sheets are impregnated with a liquid, expansions are generated between the rows of bonding parts due to the difference in ratios of the elongation of the two sheets. The expansions take on the shape of large wrinkle according to the pitch of the bonding parts. At the production process of the sheet, the sheet is crepe-processed containing water at a preset ratio, whereby small wrinkles as residual crepe wrinkles are formed on the sheet surface. The large wrinkles and the small wrinkles can enhance the wiping effect.

5 Claims, 5 Drawing Sheets

5,980,673

WIPING SHEET AND METHOD FOR PRODUCING THE SAME

BACKGROUND OF THE INVENTION

1. Field of the Invention

The present invention relates to a wet or dry wiping sheet for use in cleaning, disinfecting or sterilizing flush toilets, wiping the backside of humans, or cleaning rooms or for use as wet towel; more specifically, the present invention relates to a wiping sheet with expansions and fine wrinkles formed on the surface to thereby impart good wiping capacity to the sheet and with high strength; and a method for producing the same.

2. Description of the Prior Art

Wet sheets have been used for cleaning toilets or other rooms or have been used as a wet towel. These wet sheets consist of paper from wood pulp fiber or nonwoven fabric from absorbent fiber impregnated with cleansing fluid chemicals. The cleansing fluid chemicals include for example surfactants, cleansing components, preservatives, and fragrance in water and alcohol. As the wet sheets for cleaning flush toilets, use has been made of water-dispersion sheets (water-dispersion paper) impregnated with a fluid chemical suppressing the water dispersion.

Some of such wiping sheets are prepared so bulky to impart bulky touch to hands by laminating and bonding a plurality of sheets. As means for partially bonding between a plurality of sheets, adhesives are used in some of them. Particularly in wet sheets which can be flushed in flush toilets, water-dispersion sheets are bonded together with a water-soluble adhesive.

However, the wet sheets in prior arts are poor in bulkiness and very thin. When these wet sheets are used for wiping work being held by hands, no firm touch can be felt, so that the wet sheets may be readily slipped off through hands. Therefore, such wet sheets cannot impart good touch for use.

Furthermore, wet sheets with a flat surface disadvantageously cannot wipe off stain sufficiently from cleaning areas. Particularly, against the uneven floor with protrusions and recesses, the flat wet sheets hardly wipe off stain in the recesses.

A process of coating an adhesive on the surface of sheet made of paper or nonwoven fabric is required for bonding a plurality of sheets together with the adhesive. At the process of coating an adhesive, it is relatively easy to uniformly coat the adhesive on a given area of the surface of the sheet. However, if those sheets are bonded together through adhesives coated on a wide area, the resulting sheet is wholly stiff with poor softness to give unpleasant touch for hands in holding the sheet, because the ratio of the adhesive bonding area to the whole sheet area increases. Also, if the adhesive bonding area is too large, the wiping effect of stain may be deteriorated.

So as to bond together such sheets with an adhesive, therefore, an adhesive should be coated at intervals on the sheet surface, following a given pattern; and by subsequently using an emboss matching the coating pattern of the adhesive, preferably, the area coated with the adhesive is pressurized to form adhesive-bonding areas. The sheets, partially bonded together at intervals, may have sufficient softness and adequate ratio of the adhesive-bonding area to the whole sheet area, so that the wiping effect on the sheet surface can be enhanced.

In Japanese Patent Application No. 8-257032, the inventors of the present invention have proposed a bulky wiping sheet, which consists of a plurality of sheets with different crepe ratios to be bonded together through partial bonding areas. Being impregnated with a fluid chemical, each sheet extends in its own ratio of the elongation due to the crepe restoration, so that the expansions may be formed between the bonding areas. In this case, so as to regularly generate expansions on the sheet surface, it should be required to form the bonding areas at intervals.

The resulting wiping sheet with expansions is so bulky that the wiping sheet can be readily handled by hands, and wiping effect of stain may be excellent due to the expansions formed on the sheet surface.

However, with only the expansions formed between the sheet bonding areas, sufficient wiping effect cannot be expected against the uneven area having extremely fine protrusions and recesses.

Still more, so as to coat an adhesive at intervals following a given pattern on the sheet surface, a specific process such as screen printing is required. In this case, furthermore, the adhesive coating pattern on the sheet surface should be positioned to match the position of a pressure emboss of an emboss roll to pressurize the sheets. Thus, the arrangement and adjustment of the equipment for the work are then very laborious.

A conventional method for producing such sheets having high crepe ratios comprises;

a process of forming a web (base) from fiber such as pulp;

a process of dehydrating the web under pressure by means of a press roll;

a process of drying the web wound around a dryer with a heating roll; and a process of crepe-processing by applying a doctor blade onto the surface of the dryer and winding the web by means of a winding roll at a lead-in rate slower than the lead-out rate by means of the dryer.

According to said method, the sheet made from paper machine is dried completely or to an extremely low water content, by means of the dryer. Because the crepe is formed by applying means of the doctor blade after being dried in said manner, the resulting crepe-processed sheet may have extremely low strength or much powdery paper may be generated during the crepe-processing. This may possibly be due to the reduction of the bonding strength of the hydrogen bonds between the fibers because extraneous force from the doctor blade is loaded onto the sheet after dried.

Thus, if said bulky wiping sheet is prepared by using the sheets with a high crepe ratio produced by said conventional method, it would be extremely deteriorated in the sheet strength and be readily broken during wiping work. Still more, the powdery paper would be attached onto the surface of the wiping sheet, disadvantageously falling therefrom during wiping work.

SUMMARY OF THE INVENTION

It is an object of the present invention to solve the conventional problems described above and provide a wiping sheet of which the surface is designed to improve the wiping potency of an area having microfine protrusions and recesses.

It is another object of the present invention to provide a method for producing a wiping sheet, with excellent wiping potency of an area having microfine protrusions and recesses and with high strength.

It is a further object of the present invention to provide a wiping sheet comprising a plurality of sheets partially bonded together at bonding parts, wherein the coating pattern of an adhesive is simple and the bonding parts are partially formed at a given pitch; and a method for producing the same.

The wiping sheet of the present invention comprises at least one crepe-processed first sheet containing an absorbent fiber and a second sheet crepe-processed at a crepe ratio lower than that of the first sheet or never crepe-processed, the two sheets being partially bonded together at a plurality of bonding parts, wherein large wrinkles due to the generation of expansions between the bonding parts and small wrinkles as residual crepe wrinkles are formed on the first sheet, while the generation of expansions is due to the crepe restoration at an appropriate level of water content.

In a preferable embodiments of the present invention, the bonding parts are arranged at a given pitch in a row, and said rows extend in parallel at intervals. Between the rows of the bonding parts, large wrinkles are formed corresponding to the pitch of the bonding parts. The large wrinkles have smaller expansions in the zones connecting between the bonding parts in the adjacent rows and have larger expansions in the zones connecting between the intermediate parts between adjacent bonding parts in the adjacent rows.

On the sheet surface, therefore, the large wrinkles having protrusions and recesses are formed, due to the generation of expansions corresponding to the pitch of the bonding parts, while small wrinkles as residual crepe wrinkles are formed on each of the expansions.

Specifically, a larger number of small wrinkles as residual crepe wrinkles are formed in the zones connecting between the intermediate parts between adjacent bonding parts in the adjacent rows than in the zones connecting between the bonding parts in the adjacent rows.

The present wiping sheet is wholly bulky and readily held by hands. Additionally, the large wrinkles corresponding to the pitch of the bonding parts can remove stain, while the small wrinkles can effectively remove finer stain and stain on an area having microfine protrusions and recesses.

In the aforementioned sheet, the ratio of the elongation due to crepe restoration to the crepe ratio in the first sheet is preferably 70% or more to 90% or less, more preferably 80% or more to 90% or less.

The ratio of the tensile strength of the first sheet elongated due to crepe restoration to the tensile strength of a sheet composed of the same material as that of the first sheet but not crepe-processed is preferably 40% or more, more preferably 55% or more.

Moreover, an adhesive is coated in band-shaped regions which extend in parallel on the sheet surface to be attached to the other, and the whole attached sheets are partially pressurized along said band-shaped regions at a given pitch so as to bond the attached sheets together within the pressurized regions to form said bonding parts.

Particularly, the width dimension of the pressurized region is preferably larger than the width dimension of band-shaped region coated with the adhesive.

For use as wiping sheets which can be flushed in flushing toilets, the wiping sheet should be a water-dispersion sheet containing a water-soluble or water-swelling binder, while the adhesive should be a water-soluble adhesive.

In this case, the binder and the water-soluble adhesive are preferably composed of the same type of materials, and a fluid chemical suppressing the dissolution of both the binder and the water-soluble adhesive is impregnated into the wiping sheet.

The method for producing the wiping sheet of the present invention comprises the following processes;

a first drying process of drying a sheet by means of the first heating roll to such an extent that water might remain in the sheet, the sheet containing an absorbent fiber produced by paper machine;

a process of crepe-processing the sheet containing water by applying a blade to the first heating roll, while transferring the sheet at a lead-out rate by means of the first heating roll faster than the lead-in rate by means of a second heating roll;

a second drying process of further drying the sheet by means of the second heating roll after being crepe-processed;

a bonding process of partially bonding at least one first sheet produced at the aforementioned process to a second sheet with a crepe ratio lower than that of the first sheet or without any crepe, at a plurality of bonding parts; and a process of generating large wrinkles on the first sheet between said bonding parts, due to crepe restoration by impregnating with a liquid, whereby small wrinkles as residual crepe wrinkles are left on the first sheet.

By the aforementioned method, the drying condition at the first drying process is preferably arranged so that the water content of the absorbent fiber in the sheet is 10% by weight or more to 25% by weight or less at the process of the crepe-processing.

The bonding process of partially bonding at least one first sheet to the second sheet preferably comprises;

a process of coating an adhesive on the sheet face to form band-shaped regions which extend in parallel with the lead-out direction of the sheet; and a pressurizing process of overlaying another sheet onto the sheet face coated with the adhesive and partially pressurizing the sheets along said band-shaped regions at a given pitch so as to bond the sheets together within the pressurized regions to form said bonding parts.

The coater with a discharge slit is used at the process of coating the adhesive, and the adhesive with a viscosity of 200 cps or more to 20,000 cps or less is preferably fed from the discharge slit onto the sheet face, while the discharge slit is in contact with the sheet face.

Because the discharge slit is in contact with the sheet face, an adhesive with a relatively high viscosity can be coated on the sheet face in a secure manner. Further, because the adhesive coated in band-shaped regions has a relatively high viscosity, the adhesive won't be spread on the sheet face at an extent more than necessary, whereby the adhesion strength between the sheets can be procured sufficiently at each bonding part.

At the pressurizing process, furthermore, an emboss roll with an emboss of a larger width dimension than that of the band-shaped region coated with the adhesive is preferably used so as to partially pressurize the band-shaped regions coated with the adhesive at a given pitch.

The band-shaped regions coated with the adhesive can be pressurized by means of the emboss in a secure manner.

Additionally, in the case of producing a wet wiping sheet, a process of folding the bonded sheets is interposed after the pressurizing process, and a fluid chemical is impregnated into the folded sheets one by one at the process of generating large wrinkles.

By impregnating the sheets with a fluid chemical one by one and thereafter sealing and packaging the sheets, the impregnation of the fluid chemical can be secured.

DESCRIPTION OF THE PREFERRED EMBODIMENT

The present invention will now be described in the following embodiments with reference to drawings.

Figure 1:
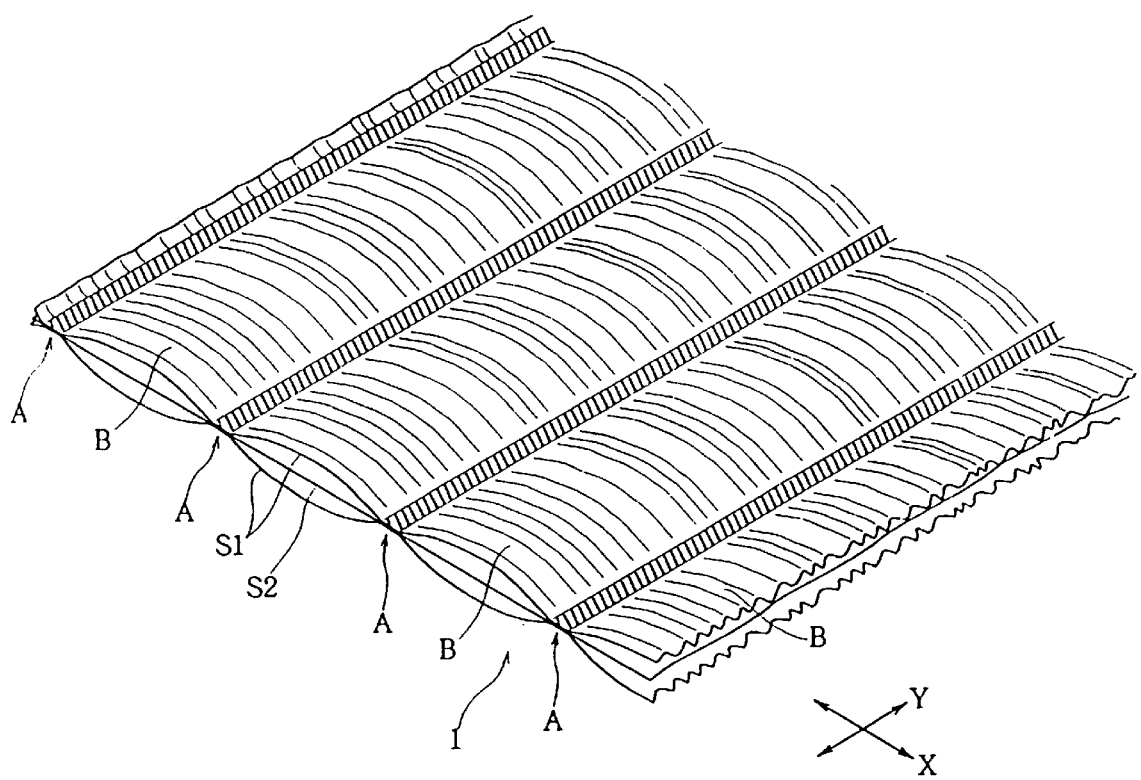
FIG. 1 is a perspective view depicting the whole structure of the wiping sheet of the present invention.

Wiping sheet 1 shown in FIG. 1 is used for cleaning rooms such as toilet room and kitchen, or wiping the backside or is used as wet towel. The wiping sheet includes non-water-dispersion wet sheet impregnated with cleansing chemical liquids, water-dispersion wet sheet which can be flushed into flush toilets after wiping off stain, and dry sheet to be used in a dry state.

The wiping sheet 1 is in a three-ply sandwich structure comprising two pieces of first sheet S1 and one piece of second sheet S2, wherein the second sheet S2 is interposed and bonded between the two pieces of the first sheets S1, S1. The first sheet S1 is produced of pulp fiber and the like by paper machine and then crepe-processed. The second sheet S2 is crepe-processed less than that of the first sheet S1 or is never crepe-processed.

Figure 2A:
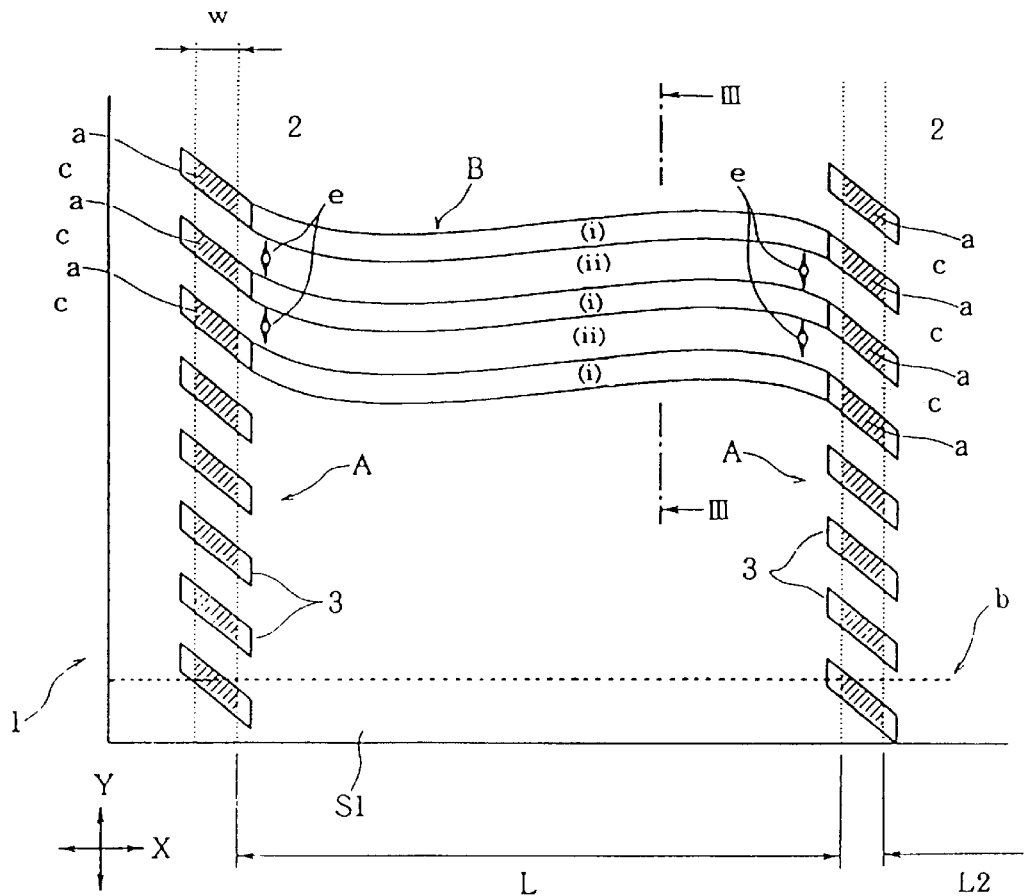
FIG. 2(A) is an enlarged partial plane view of FIG. 1, depicting the arrangement of the bonding parts.

FIGS. 2(A) and (B) are enlarged partial views of FIG. 1, schematically depicting the adhesive bonding areas A. The coordinates (X, Y) in FIGS. 2(A) and (B) corresponds to the coordinates (X, Y) shown in FIG. 1. Additionally, FIGS. 3(A), (B) and (C) depict the bonding processes of sheets and the expanded state of the wiping sheet, and correspond to the cross sectional view of FIG. 2(A) along line III—III.

In FIGS. 1 through 3, the Y direction is the lead-in direction (machine direction; MD) at the production process, and the X direction is the width direction (cross direction; CD). The X direction is also the crepe direction, in which microfine wrinkles "b" formed by crepe-processing are elongated by crepe restoration.

The adhesive bonding areas A, which bond together three sheets, extend in the Y direction in rows, having the given interval L in the X direction between each other. At the adhesive bonding areas A, adhesive 2 is coated in band-shaped regions on the sheet surface. The band-shaped regions coated with the adhesive 2 extend in a linear line in the Y direction (MD), having given width dimension W in the X direction (CD).

The band-shaped regions coated with the adhesive 2 are partially pressurized at a given pitch "p". In FIGS. 2(A) and (B), the pressure regions are shown by symbol 3. The pressure regions 3 are formed through pressurizing and heating by means of heat emboss 5a shown in FIG. 3(A), and each of the pressure regions 3 extends obliquely to both the X and Y directions.

The overlapping parts with the band-shaped regions coated with the adhesive 2 and the pressure regions 3 (indicated by hatching) are bonding parts "a", whereby the sheets are bonded together the first sheet S1 and the second sheet S2 strongly with the adhesive. On the other hand, in the band-shaped regions coated with the adhesive 2 excluding the bonding parts "a" (regions indicated by "c"), the sheets are not bonded together; even if the sheets are bonded together, the adhesion strength thereof is extremely weak, compared with the adhesion strength of the bonding parts "a".

As a result, in the adhesive bonding area "A", a plurality of the bonding parts "a" having a short line shape in each are aligned in a row at given pitch "p" in the Y direction, and each of the bonding parts "a" is oblique to both the X direction (crepe direction) and Y direction (the direction of the pitch "p"). Additionally, the interval between the rows of aligned bonding parts "a" is shown by "L".

When the sheets S1 and S2 are impregnated with a cleansing fluid chemical, microfine wrinkles "b" formed by crepe-processing expand in the Y direction and are then restored. Because the first sheet S1 and the second sheet S2 are extremely strongly bonded together at the bonding parts "a", the elongation of the second sheet S2 in the Y direction scarcely occurs at the bonding parts "a". In the regions "c" between the adjacent bonding parts "a", alternatively, the first sheet S1 and the second sheet S2 do not adhere together or the adhesion strength of the sheets is very weak even if bonded together. Accordingly, the second sheet S2 is likely to elongate in the Y direction being loosed in the regions "c". Consequently, the regions between the adhesive bonding areas A, namely the interval L between the rows of the bonding parts "a", a valley zone of the large wrinkle is formed in a band due to expansion in the region (i) connecting between the bonding parts "a" in two adjacent rows, while a mountainous zone of the large wrinkle is formed in a band due to expansion in the region (ii) connecting between the intermediate regions "c" in the two adjacent rows. Because the region (ii) can be allowed to expand in the Y direction larger than the region (i), the wiping sheet can expand in the mountainous zone much more than in the valley zone.

Figure 2B:
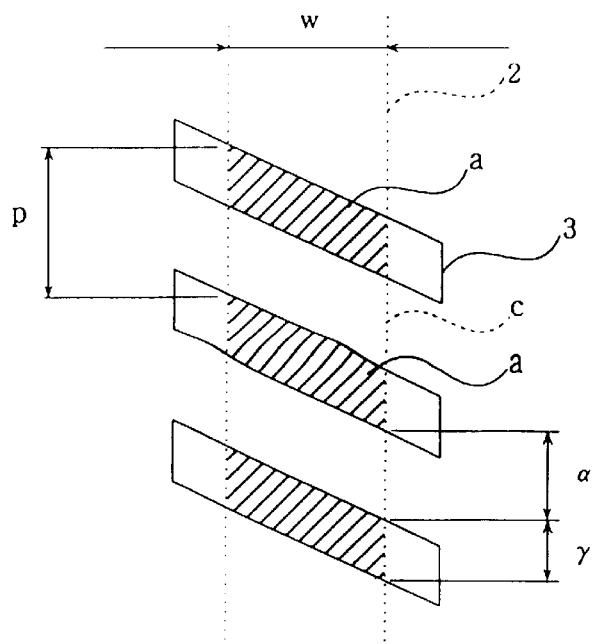
FIG. 2(B) is an enlarged partial plane view of FIG. 2(A)

In the interval L between the rows of the bonding parts "a", thus, protrusions and recesses repeatedly appear at a pitch almost equal to the pitch "p" of the aligned bonding parts "a". In FIG. 1, the large wrinkles due to the expansion of the first sheet S1 between the rows of the bonding parts "a" are represented by "B". The width dimension in the Y direction of the mountainous zone of large wrinkles "B" in the region (ii) is determined by the interval a of the bonding parts "a" as shown in FIG. 2(B); and the width dimension in the Y direction of the valley zone of large wrinkles "B" in the region (i) of is determined by the width dimension γ of the bonding parts "a".

Furthermore, each of the bonding parts "a" are formed obliquely to both the X direction (crepe direction) and Y direction (the direction of the pitch). Therefore, the crepe wrinkles "b" in the region "L" and the crepe wrinkles "b" in the next interval "L1" are intercepted through boundary oblique bonding part "a", so that almost no crepe wrinkles "b" are continuous over the interval L and the next interval L1. This will be explained by using a dotted line in FIG. 2(A), representatively illustrating one crepe wrinkle "b". Therefore, protrusions and recesses on the first sheet S1, namely large wrinkles "B", are independently formed in the interval L and the interval L1, whereby each large wrinkle "B" may have stronger nerve, so that the large wrinkles "B" might not be readily crushed.

Since the large wrinkle "B" can be formed in an emphasized manner, the bulkiness is imparted to the whole wiping sheet 1 as shown in FIG. 1. Furthermore, the large wrinkles "B" can make the wiping sheet 1 readily held by hands and enhance the wiping effect of stain with protrusions and recesses. Particularly, the larger expansions (mountainous zone of large wrinkles "B") in the region (ii) contribute to the enhancement of the wiping effect of stain.

Figure 3A:
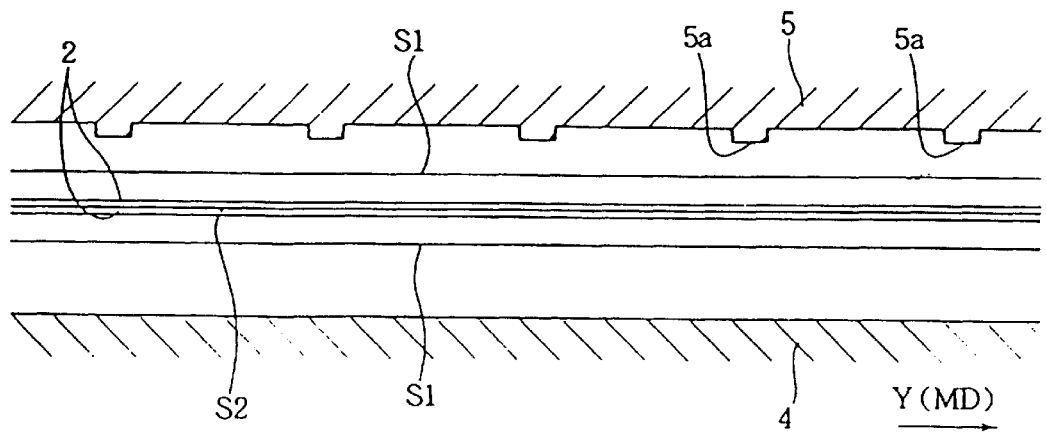
FIGS. 3(A), (B) and (C) depict sequentially the production process of the wiping sheet of the present invention, corresponding to the cross sectional view of FIG. 2(A) along line III—III.
Figure 3B:
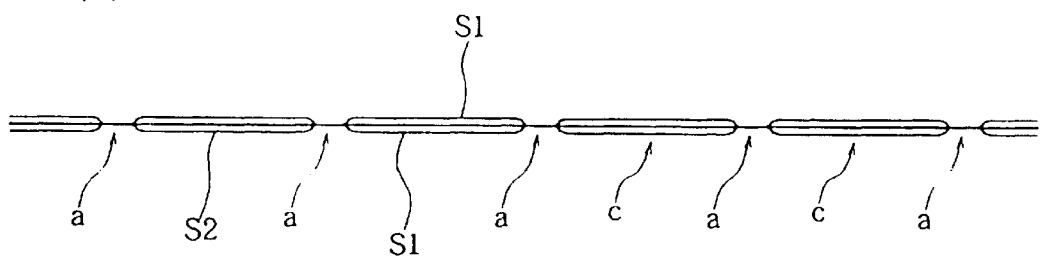
Figure 3C:
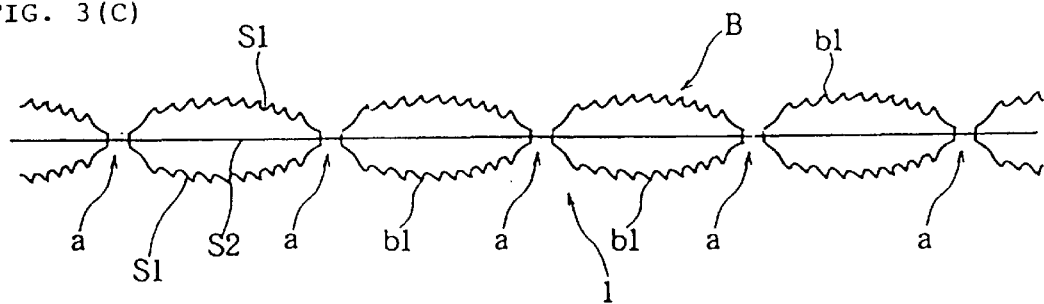

When the first sheet S1 turns wet impregnated with fluid chemicals and then large wrinkles "B" are formed due to the restoration of the crepe wrinkles "b", residual crepe wrinkles "b" are left on the first sheet S1, so as to form microfine small wrinkles "b1", as shown in FIG. 3(C). The microfine small wrinkles "b1" are left on both the mountainous zone of the large wrinkles "B" in the regions (ii) and the valley zone of the large wrinkles "B" in the regions (i). The region (i) is under restriction of the bonding parts "a" at both the left side and the right side, and therefore, the region (i) has small elongation in the Y direction. Thus, the small wrinkles "b1" remain in the region (i) more than in the region (ii).

By using the wiping sheet 1, stain on floor can be effectively removed due to the presence of wrinkles "B" with larger expansions, while fine stain or dust can also be wiped off due to the presence of finer small wrinkles "b1" as residual crepe wrinkles. Due to the fine small wrinkles "b1", furthermore, the wiping sheet can effectively remove stain on the areas with very fine protrusions and recesses, for example, floor, tile and toilet equipment. Accordingly, the present wiping sheet can remove stain more effectively.

If the basis weights of the first sheet S1 and the second sheet S2 are too large, the sheet flexibility may be reduced so that the resulting sheet turns too hard to wipe off stain; if the basis weights are too small, the strength of the resulting sheet is may be reduced to cause break of the sheet during wiping work, disadvantageously. Therefore, preferably, the basis weights of the first sheet S1 and second sheet S2 are independently 20 g/m$^2$ or more to 100 g/m$^2$ or less. When the wiping sheet 1 has a two-ply structure comprising the first sheet S1 and the second sheet s2, the total basis weight of the resulting sheet is 40 g/m$^2$ or more to 200 g/m$^2$ or less; when the wiping sheet 1 has a three-ply structure comprising two first sheets S1, S1 respectively bonded to the surface and back face of the second sheet S2, the total basis weight of the resulting sheet is 60 g/m$^2$ or more to 300 g/m$^2$ or less.

Both the first sheet S1 and the second sheet S2 are made of paper containing natural fiber such as wood pulp, cotton fiber, linen fiber, and bamboo fiber as the absorbent fiber; and paper containing the natural fiber and chemical fiber such as rayon, and preferably contain the absorbent fiber such as natural pulp at 50% by weight or more. Otherwise, the sheets are made of nonwoven fabric.

The sheets may be bonded together by means of hot melt adhesives such as EVA. When these sheets are bonded together by water-insoluble bonding means such as hot melt adhesives, any cleansing fluid chemical contained in the sheets may not dissociate the bonding between the sheets by the bonding means. As the cleansing fluid chemical, use is made of surfactants, cleansing ingredients, preservatives and fragrance, contained in water and alcohol. Otherwise, the wiping sheets may be put on sale in a dry state, and users may impregnate the sheet with water or the cleansing fluid chemical, prior to use. When the sheet is on sale in a dry state, the sheet is preliminarily impregnated with water and the like, to cause the generation of expansions due to crepe restoration of the first sheet S1, which is then dried in hot air and the like. Because the large wrinkles can be retained at a dry state, the bulkiness of the wiping sheet may not be lost. Otherwise, the wiping sheet in a dry sheet without crepe restoration may be on sale. When users impregnate the wiping sheet with water or a cleansing fluid chemical, crepe is restored to generate large wrinkles.

For constructing a water-dispersion wet sheet, the first sheet S1 and the second sheet S2 are produced by paper machine, blending natural pulp fiber (for example, at 90% by weight) and carboxymethylated pulp as a water-swelling binder (10% by weight),. Alternatively, water-soluble binders such as carboxymethyl cellulose can be blended.

As the adhesive 2 bonding together the sheets, water-soluble adhesives such as sodium carboxymethyl cellulose are used. The fluid chemical impregnated into the wiping sheet 1 contains at least one kind of metal ion selected from the group consisting of $CaCl_2$, $ZnSO_4$, and $MgSO_4$ and the like. The binder and the water-soluble adhesives induce the cross-linking complexation with these metal ions. Thus, the dissolution of the binder and the water-soluble adhesives in the fluid chemical is suppressed, so that the strength of the sheet can be maintained even during wiping work. When the sheet is flushed in flush toilet after use, the metal ions are diluted in a vast amount of water, so that the adhesive bonding of the sheets at the bonding parts "a" is dissociated and the binder swells so as to induce the dissociation of the pulp fiber.

As the binder, use is made of polyvinyl alcohol, sodium alginate, or starch. In this case, the same type of the water-soluble adhesives may be used.

*22-2 When the binder and the water-soluble adhesives both comprise polyvinyl alcohol, the fluid chemical should contain at least one kind of metal ion selected from the group consisting of $Na_2SO_4$, KCl, and $K_2SO_4$. The binder and the water-soluble adhesives induce salting out via the metal ions, which then suppresses the dissolution of these chemical agents in the fluid chemical. Accordingly, both the strength of the sheet and the bonding strength can be enhanced. In this case, also, the metal ion is diluted with water, when the sheet is flushed in flush toilet, to dissociate the bonded sheets from each other and then disperse the sheets in water.

The method for producing the wiping sheet 1 will now be described below.

Figure 5:
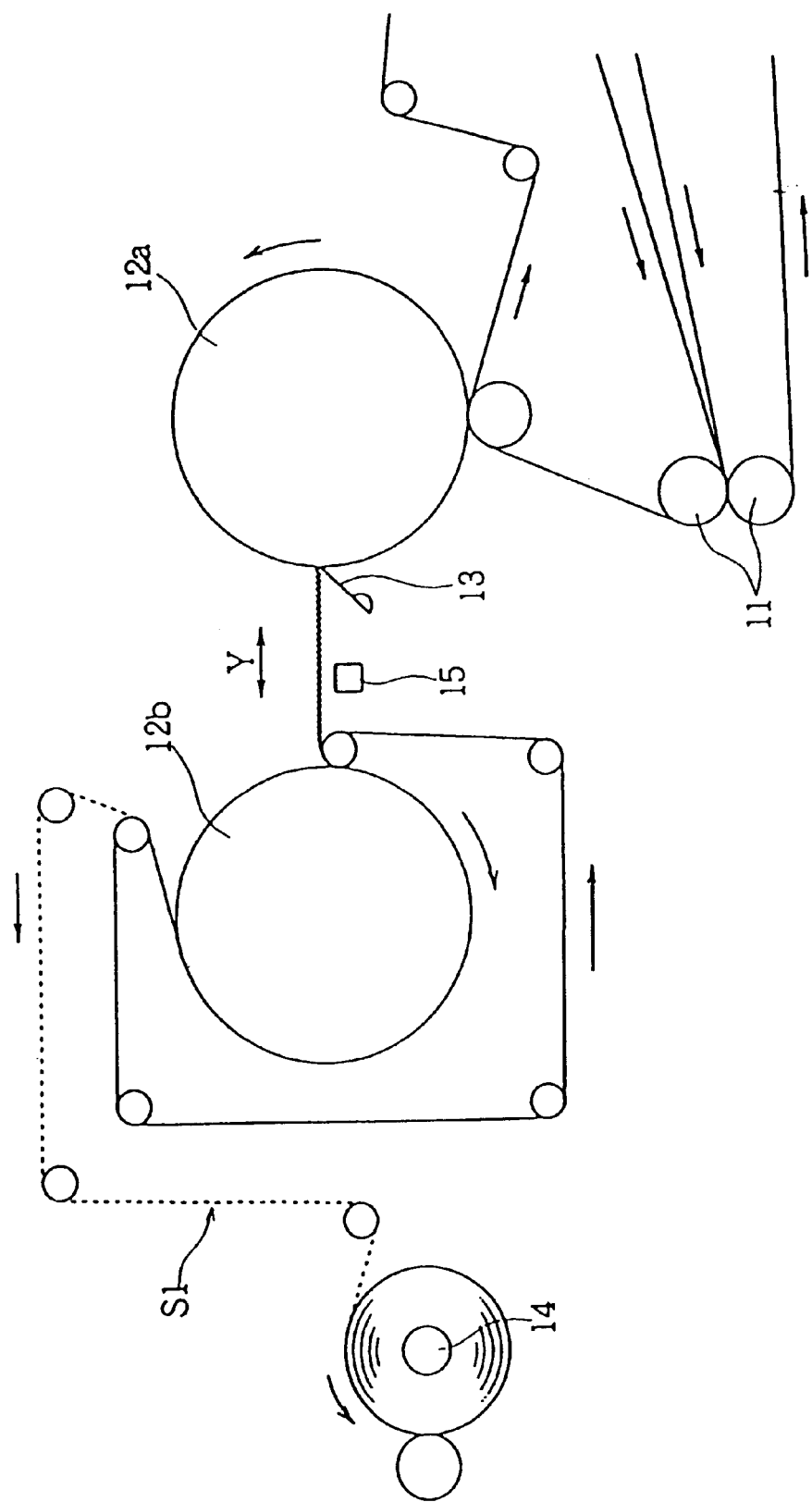
FIG. 5 is an explanatory view of the production process of the first sheet.

FIG. 5 depicts the production process of the first sheet S1 with a high crepe ratio.

A web (base), for example, containing an absorbent fiber such as natural pulp at 90% by weight and a water-swelling binder such as carboxymethylated pulp at 10% by weight is pressed and dehydrated by means of press roll 11 after being made into paper, which is then subjected to the first drying process.

At the first drying process, first dryer 12a is arranged. The first dryer 12a is a heating roll, and by winding the web around the first dryer 12a, the web is dried to some extent such, while water remains. Water meter 15 is arranged at a position to which the sheet is led out from the first dryer 12a, and on the basis of the value determined by the water meter 15, the heating temperature of the first dryer 12a is feedback controlled. It is preset that the water content in the sheet dried by means of the first dryer 12a be 10% by weight or more to 25% by weight or less. For a sheet consisting of pulp fiber and carboxymethylated pulp, the water content is represented by water in % by weight to the total sheet. For a sheet consisting of an absorbent fiber and a non-absorbent fiber, the water content in the absorbent fiber is preferably 10% by weight or more to 25% by weight or less.

Doctor blade 13 is applied to the outer face of the first dryer 12a. Second dryer 12b is arranged at the following step of the first dryer 12a, and the lead-out rate of the sheet from the first dryer 12a is faster than the lead-in rate of the second dryer 12b. Through the ratio of the lead-out rate of the first dryer 12a to the lead-in rate of the second dryer 12b and the action of the doctor blade 13, the sheet is crepe-processed. When the lead-in rate of the second dryer 12b is 50% of the lead-out rate of the first dryer 12a, for example, the crepe ratio is 50%.

The crepe-processed sheet is wound around the second dryer 12b. The second dryer 12b is also a heating roll so that the sheet is absolutely dried or dried to a water content of about several %. After dried at the second drying process by means of the second dyer 12b, the first sheet S1 is wound around winding roll 14.

At the production process shown in FIG. 5, the web is dried to an extent such that water remains more or less in the web, preferably to a water content of 10% by weight or more to 25% by weight or less by means of the first dyer 12a. Thereafter, the doctor blade 13 is applied to the sheet and then the sheet is crepe-processed. Therefore, the deterioration of the sheet strength at the process of crepe-processing can be reduced, while the generation of powdery paper caused by applying the doctor blade 13 can be suppressed. This may possibly be due to the low deterioration of the hydrogen bonding between the fibers because the sheet contains more or less water at the process of crepe-processing, compared with the conventional crepe-processing at a dry state. So as to prevent the deterioration of the sheet strength, which may be possibly caused by the deterioration of the hydrogen bonding, the water content of the sheet dried by means of the first dryer 12a is essentially 10% by weight or more (10% by weight or more to the absorbent fiber).

By means of the second dryer 12b, the sheet is furthermore dried absolutely or almost absolutely after crepe-processed. If the water content of the sheet at the process of crepe-processing is below a given content, the sheet dried by the second dryer 12b may elongates in the Y direction (MD) in a high ratio of the elongation due to crepe restoration, when a fluid chemical is impregnated. Provided that the sheet is crepe-processed at a high water content and is then dried, the ratio of the elongation due to the crepe restoration is very low when the sheet thereafter gets wet. This may possibly be due to the strong hydrogen bonding between the fibers in the sheet after crepe-processed, if the sheet is crepe-processed at a high water content and is then dried. Thus, the water content of the sheet at the process of crepe-processing is preferably 25% by weight or less, so as to increase the ratio of the elongation due to crepe restoration to some degree and efficiently form large wrinkles "B" due to the expansions of the first sheet S1, so that the bulky wiping sheet 1 can be prepared as shown in FIGS. 1 and 3(C).

Furthermore, provided that the water content at the process of crepe-processing is preset to 25% by weight or less, small wrinkles "b1" as residual crepe wrinkles are formed on the surface of the large wrinkles "B", as shown in FIG. 3(C).

Based on what has been described above, the drying condition by means of the first dryer 12a is preferably such that the water content of the sheet is 10% by weight or more to 25% by weight or less to the absorbent fiber of the sheet. This condition prevents the deterioration of the sheet strength by crepe-processing and enhances the ratio of the elongation of the sheet due to crepe restoration, whereby the ratio of the elongation/the crepe ratio is preferably 70% or more, more preferably 80% or more. The upper limit of the ratio of the elongation/the crepe ratio is preferably 90%.

The crepe ratio means the ratio of the lead-in rate of the sheet in the downstream to the lead-out rate of the sheet in the upstream at the process of crepe-processing. On the other hand, the ratio of the elongation is represented by the formula;

$$((\Delta x - x)/x) \times 100 (\%)$$

wherein x is the original length of a sheet; $\Delta x$ is the length of the sheet elongated due to crepe restoration by being floated on a liquid.

When the ratio of the tensile strength (the tensile strength of a sheet with restored crepe to the tensile strength of a sheet not crepe-processed) is 40% or 45% or more, more preferably 55% or more, a wiping sheet with a higher strength can be formed. The upper limit of the ratio of the tensile strength is preferably 65% or about 70%.

The basis weight of the first sheet S1 is preferably about 20 $g/m^2$ or more to 100 $g/m^2$ or less at its elongated state due to crepe restoration.

The bonding process of the sheets will now be described below.

Figure 6:
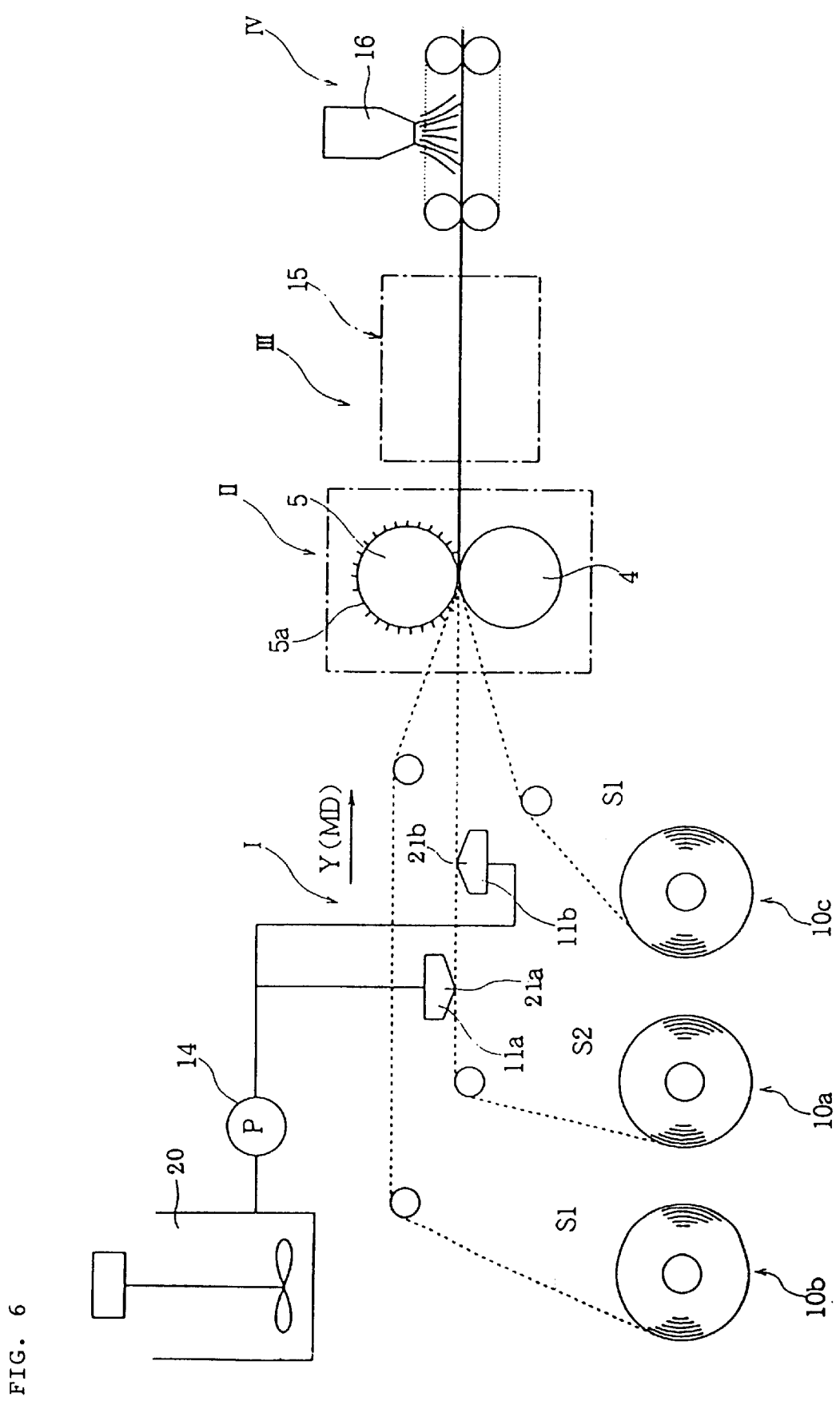
FIG. 6 is an explanatory view depicting the bonding process of the wiping sheet.

FIG. 6 is a side view depicting the equipment for producing the wiping sheet 1; FIGS. 3(A), (B) and (C) are explanatory views of the production process, corresponding to the cross sectional view of the wiping sheet 1 along line III—III in FIG. 2(A).

As shown in FIG. 6, the first sheet S1 with a high crepe ratio is fed from the rolled base papers 10b and 10c; and second sheet S2 with a low crepe ratio or with no crepe is fed from the rolled base paper 10a.

At the adhesive coating process I, adhesive 2 is coated on both the surface and back face of the second sheet S2, whereby the first sheets S1, S1 are attached respectively. At the adhesive coating process I, two coaters 11a and 11b are arranged as coating machines. Multiple rows of discharge slits 21a and 21b, with a width dimension of almost W, are opened through the coaters 11a and 11b, and discharge slits 21a and 21b are in contact with both the surface and back face of the second sheet S2. Furthermore, the width dimension of each opening of the discharge slits 21a and 21b in the Y direction (MD) is about 1 mm to 3 mm.

By means of constant delivery pump 14 such as a gear pump, adhesives such as carboxymethyl cellulose-Na are fed from tank 20 into the coaters 11a and 11b. A constant volume of an adhesive is fed by means of the constant delivery pump 14, while in accordance with the lead-in rate of the second sheet S2 along in Y direction (MD), whereby the adhesive is coated from the discharge slits 21a, 21b of the coaters 11a, 11b onto both the surface and back face of the second sheet S2.

Herein, the viscosity of the adhesive is relatively high of 200 cps or more to 20,000 cps or less. The viscosity is measured under condition of 6 rpm and 20° C. by using a B-type viscometer manufactured by Shibaura System Co. Ltd. Because the discharge slits 21a and 21b are in contact with both the faces of the second sheet S2, an adhesive of a relatively high viscosity can uniformly be coated on the second sheet S2. By using such an adhesive of a relatively high viscosity, the adhesive 2 given from the discharge slits 21a and 21b on the second sheet S2 is uniformly coated in band-shaped regions with a width dimension W ,as shown in FIGS. 2(A) and (B), which dimension is almost equal to the width dimension of the openings of the discharge slits 21a and 21b.

If the viscosity of the adhesive is below 200 cps, the adhesive is dispersed leftward and rightward on the faces of the second sheet S2, so that the adhesive coated on the second sheet S2 may have a width dimension wider than the width dimension W. If the viscosity is low, the adhesive readily permeates into the inside of the sheet, which causes too much enlargement of the width dimension and additionally causes no formation of an adhesive layer on the sheet faces required for strong bonding of the sheets. If the viscosity of the adhesive is above 20,000 cps, additionally, the adhesive cannot uniformly be coated on the sheet faces from the coaters 11a and 11b. Therefore, the viscosity of the adhesive is preferably 200 cps or more to 20,000 cps or less, more preferably 200 cps or more to 10,000 cps or less.

By keeping the coaters 11a and 11b in contact with the second sheet S2, the adhesive of such a relatively high viscosity can uniformly be coated. Therefore, the adhesion strength of the bonding parts "a" in the bonded sheets can be increased, while the adhesion strength of each of the bonding parts "a" is constant.

In FIG. 6, the coaters 11a and 11b are in contact with both the faces of the second sheet S2, but these coaters may be in contact with the attaching face of the upper first sheet S1 and with the attaching face of the lower first sheet S1.

The coaters are preferable examples for coating an adhesive of a relatively high viscosity uniformly at a constant width dimension, however any means, other than such coaters, may be applied, such as gravure coating or flexo-coating.

After the adhesive 2 is coated in band-shaped regions on both the surface and back face of the second sheet S2, the three sheets are laminated together, and then bonded together under pressure at the pressure bonding process II.

At the pressure bonding process II, heating roll 4 with flat surface and heating emboss roll 5 with emboss 5a formed on the surface are arranged, wherein the three sheets in lamination are held and led through both the heating rolls 4 and heating emboss roll 5 with the rotation of the rolls toward the Y direction. The pattern of the emboss 5a on the surface of the heating emboss roll 5 is almost similar to the pattern of the pressure region 3, having a plurality of protrusions, as shown in FIGS. 2(A) and (B).

While heating the sheets S1, S1 and the sheet S2 by means of the heating roll 4 and heating emboss roll 5, the emboss 5a partially pressurizes the band-shaped regions coated with the adhesive 2 at intervals. As shown in FIG. 3(B), consequently, the band-shaped regions coated with the adhesive 2 overlapped with the pressure region 3 are heated under pressure by means of the emboss 5a, so that bonding parts "a" may be formed while being strongly. On the other hand, in the region "c", with no application of the emboss 5a among the band-shaped regions coated with the adhesive 2, the sheets are not bonded together or the sheets may slightly be bonded together at a low adhesion strength.

The adhesive 2 is coated in band-shaped regions on the sheet faces, but an actual bonding part or a primary bonding part or a bonding part with the highest bonding strength can be formed by partially pressurizing band-shaped regions at a given pitch. In such manner, the adhesive can be continuously coated on the sheet faces; the adhesive coating process can be simplified; and the adhesive of a relatively high viscosity can uniformly be coated. Furthermore, the bonding parts bonding together the sheets strongly with the adhesive can be formed at a given pitch, so that the area ratio of the bonding parts to the whole sheet is reduced, whereby the softness of the resulting sheet can be retained and additionally, good touch can be given to hands at wiping work. It also contributes to procure the large surface area to be used for wiping off stain.

If the width dimension of the pressure regions is larger than the width dimension of the band-shaped regions coated with the adhesive as shown in FIG. 2(B), furthermore, the band-shaped regions coated with the adhesive can absolutely be included in the pressure regions even if the band-shaped regions coated with the adhesive and the pressure regions are not arranged exactly in the appointed positions in the X direction, so that the area of the bonding parts can be procured as preset in the pressure regions, whereby the reduction of the adhesion strength of the sheet can be prevented.

After the adhesive bonding process II, the sheet is led to folding process III. Folding machine 15 at the folding process III cuts the bonded sheet into a given length, which is then folded into its ¼ size or ⅛ size.

The folded sheet is transferred to the fluid chemical impregnation process IV. At the fluid chemical impregnation process IV, a fluid chemical is given to each folded sheet from coating spray 16. Thereafter, the folded sheets impregnated with the fluid chemical are packaged and sealed up. Because the fluid chemical is impregnated into each sheet, the fluid chemical can permeate into each folded sheet in a secure manner when the sheet is sealed in a package. The fluid chemical is a cleansing fluid chemical, comprising water, alcohol, a surfactant, a preservative, and a deodorant and fragrance in mixture. For water-dispersion sheets, furthermore, the chemical contains components such as metal ion, which can suppress water-dispersion of a binder in the sheets S1 and S2 and also suppress water-dispersion of the adhesive 2 coated on the sheet S2.

After impregnation with the cleansing fluid chemical, microfine small wrinkles "b" formed at the process of crepe-processing expand in the Y direction, so that the large wrinkles "B" are formed within the interval L, namely between the adhesive bonding areas "A" extending in the Y direction, due to the expansions in the region (i) and the expansions in the region (ii), as shown in FIG. 2(A), At the production process of the first sheet S1 as shown in FIG. 5, the sheet at the process of crepe-processing with the doctor blade 13 contains water at 10% by weight or more to 25% by weight or less. In this case, when the crepe-processed first sheet S1 is impregnated with a fluid chemical after dried by the second dryer 12b, not all the crepe wrinkles on the first sheet S1 elongate but some of the crepe wrinkles remain as residue without restoration. More specifically, the ratio of the elongation/the crepe ratio is then 70 to 90%.

As shown in FIG. 3(C), therefore, small wrinkles "b1" as the residual crepe wrinkles are formed on the surface of the large wrinkles "B" due to crepe restoration. This may be because the crepe wrinkles "b" may partially be hydrogen bonded after crepe-processed due to the water contained in the sheet at the process of crepe-processing. When the wiping sheet 1 is impregnated with a fluid chemical, the first sheet S1 elongates due to the restoration of crepe wrinkles "b" but not all the crepe wrinkles elongate but some remain in the form of the small wrinkles "b1".

The wiping sheet 1 thus formed is packaged, at a wet state impregnated with the cleansing fluid chemical, in a plastic container and the like.

Additionally, the wiping sheet 1 may be in the form of not only wet sheet but also dry sheet. In this case, the first sheets S1 and the second sheet S2 are bonded together with an adhesive at the production process, and, after being impregnated with the cleansing fluid chemical or disinfected water or sterilized water or a preservative, to form large wrinkles "B" due to expansions on the first sheet S1, the resulting sheet is dried in the hot air and the like. Even after the wiping sheet 1 is dried, the large wrinkles "B" can keep their expansion in such manner, so that the resulting sheet is bulky.

Figure 4:
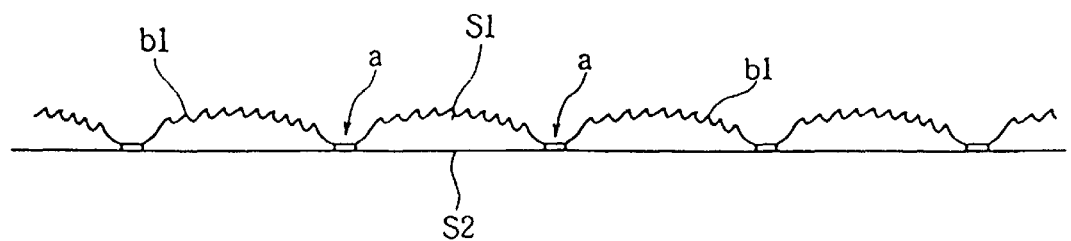
FIG. 4 is a cross sectional view depicting another structure of the laminated sheets of the wiping sheet of the present invention.

As shown in FIG. 4, furthermore, one piece of second sheet S2 crepe-processed with a low crepe ratio or never crepe-processed may be laminated on one piece of first sheet S1 crepe-processed with a high crepe ratio so as to prepare a wiping sheet of a two-ply structure.

In FIG. 2(B), additionally, the bonding parts "a" are aligned at a constant pitch in the row direction, but pitch "p" along the row direction may vary between the bonding parts "a", or the pitch "p" may vary in a cyclic fashion in the row direction. In FIG. 1, furthermore, the row of the bonding parts "a" extends in a line toward the Y direction, but the row of the bonding parts "a" is not necessarily linear, but the row may extend in a curvature line or a zigzag line.

ASSESSMENT OF PREFERRED EMBODIMENTS

There will be now assessed of the preferred embodiments as the first sheet S1 produced at the production process shown in FIG. 5.

In Both embodiments and comparative examples, the base paper of the sheet was produced by the paper machine in a wet state, blending together 90% by weight of pulp and 10% by weight of carboxymethylated pulp as a water-swelling binder. The basis weight before crepe-processing was 20 g/m$^2$; and the basis weight after crepe-processing was 40 g/m$^2$.

The temperature of the surface of the second dryer 12b was preset to 110° C. The temperature of the surface of the first dryer 12a was adjusted, so as to generate the difference in water content between embodiments and comparative examples. The peripheral velocity of the first dryer 12a was 100 m/min; and the peripheral velocity of the second dryer 12b was 50 m/min. The crepe ratio was 50%.

Embodiments

As shown in Table 1, in Embodiment 1, the surface temperature of the first dryer 12a was controlled so that the water content of the whole sheet was 10% by weight, after the first drying process by means of first dryer 12a.

In Embodiment 2, the surface temperature of the first dryer 12a was controlled so that the water content of the whole sheet which was 25% by weight, after the first drying process by means of first dryer 12a.

The water content of the sheet after the second drying process by means of second dryer 12b was 3% by weight, in both the Embodiments 1 and 2.

Comparative Examples

In Comparative Example 1, the surface temperature of the first dryer 12a was controlled so that the water content of the whole sheet was 5% by weight, after the first drying process by means of first dryer 12a.

In Comparative Example 2, the surface temperature of the first dryer 12a was controlled so that the water content of the whole sheet was 35% by weight, after the first drying process by means of first dryer 12a.

In both the Comparative Examples 1 and 2, the water content of the whole sheet after the second drying process by means of the second dryer 12b was 3% by weight.

ASSESSMENT OF SHEETS

The sheets of the Embodiments and Comparative Examples were set afloat in liquid, to measure the ratio of the elongation (%) of the sheets due to crepe restoration. Furthermore, the ratio of the elongation/the crepe ratio (×100%) was calculated.

So as to measure the ratio of the tensile strength, the samples were produced in the same manner as in the Embodiments and Comparative Examples, except that the samples were not subjected to the process of crepe-processing. Then, the tensile strength thereof in the machine direction (MD) was measured, to calculate the ratio of the tensile strength (tensile strength of crepe-processed sheets of Embodiments and Comparative Examples/tensile strength of not crepe-processed samples) (%).

The tensile strength was represented by a tensile load when a test piece of a width dimension of 25 mm was broken, during elongation at a rate of 100 mm/min by means of Tensilon in machine direction.

TABLE 1

| | Embodiment 1 | Embodiment 2 | Comparative Example 1 | Comparative Example 2 |
|---|---|---|---|---|
| Water content after process with first dryer | 10% | 25% | 5% | 35% |
| Water content after process with second dryer | 3% | 3% | 3% | 3% |
| Basis weight | 40 g/m$^2$ | 40 g/m$^2$ | 40 g/m$^2$ | 40 g/m$^2$ |
| Crepe ratio | 50% | 50% | 50% | 50% |
| Ratio of elongation | 45% | 40% | 48% | 20% |
| Ratio of elongation/ Crepe ratio × 100 | 90% | 80% | 96% | 40% |
| Ratio of tensile strength | 55% | 65% | 35% | 75% |
| Note | | | a vast amount of powdery paper is generated because of the low water content after the process with first dryer. | |

RESULTS OF ASSESSMENT

Embodiments

In Embodiments 1 and 2, the ratios of elongation/crepe ratio were 90% and 80%, respectively. Therefore, the sheets were elongated sufficiently due to crepe restoration when the sheets were impregnated with fluid chemicals and additionally, some of the crepe wrinkles were left to appropriately form small wrinkles "b1".

The ratios of the tensile strength were 55% and 65% respectively, and the resulting sheets had such greater strength that the wiping sheets can be made sufficiently strong.

Comparative Examples

In the Comparative Example 1, the ratio of elongation/ crepe ratio was 96%; in the Comparative Example 2, the ratio was 40%.

In the Comparative Examples 1 and 2, the ratios of the tensile strength were 35% and 75%, respectively. In the Comparative Example 1, a great amount of powdery paper was generated in the crepe-processed sheet after the process of the first dryer 12a.

In the Comparative Example 1, since the water content of the sheet dried with the first dryer 12a was too low, the hydrogen bonding may be deteriorated, so that when doctor blade 13 was applied to the sheet for crepe-processing, the strength of the resulting sheet was prominently reduced. In the Comparative Example 2, on the other hand, the water content was too high at the time of crepe-processing, so that the hydrogen bonding after crepe-processing was enhanced to reduce the ratio of the elongation due to the crepe restoration.

PRODUCTION OF SHEETS

Each of Embodiments and Comparative Examples was used as first sheet S1; second sheet S2 was produced in the same blend ratio as in the Embodiments and Comparative Examples but without crepe-processing; water-soluble carboxymethyl cellulose (CMC) was used as adhesive 2. At the production process shown in FIG. 6, the wiping sheets comprising two first sheets S1 and one second sheet S2, as shown in FIG. 1, were produced and were then impregnated with a fluid chemical.

In the case using Embodiments 1 and 2, large wrinkles "B" were formed between the bonding parts "a" since the crepe wrinkles were restored; additionally, small wrinkles "b1" as the residual crepe wrinkles were also formed on the large wrinkles "B". The resulting wiping sheets were bulky because of the presence of the large wrinkles "B" due to crepe restoration.

In the case using Comparative Examples 1, the water content of the resulting sheet was low at the time when the sheet passed through the process by means of the first dryer 12a and because crepe-processing was carried out on such sheet with a low water content, the ratio of the elongation of the first sheet S1 was high when impregnated with a fluid chemical. Therefore, large wrinkles "B" could be formed due to the crepe restoration between the bonding parts "a", but the crepe wrinkles were absolutely restored to their limit. Therefore, small wrinkles "b1" were never formed in a secure manner. Furthermore, the strength of the first sheet S1 was extremely low.

In the case using Comparative Examples 2, because the ratio of the elongation of the first sheet S1 due to crepe restoration impregnated with the liquid chemical was so low that the first sheet S1 did not elongate sufficiently between the bonding parts "a". Therefore, since large wrinkles "B" could not be formed prominently, no bulky wiping sheet could be produced.

The results of Table 1 indicate that the ratio of the elongation/the crepe ratio is preferably 70% or more to 90% or less so as to prepare a bulky wiping sheet, form large wrinkles "B" with sufficient expansion between the bonding parts "a" and additionally form small wrinkles "b1" on the expansions. Also so as to secure the sheet strength required for wiping work, the ratio of the tensile strength is preferably 40% or more to 70% or less.

Furthermore, the crepe ratio is preferably 25% or more to 70% or less.

As has been described above, in accordance with the present invention, the large wrinkles "B" and small wrinkles "b1" can be produced on the surface of the wiping sheet, whereby the wiping effect of stain can be enhanced.

By the method for producing a wiping sheet in accordance with the present invention, said wiping sheet having the large wrinkles "B" and small wrinkles "b1" can be produced.

Also, an adhesive can be coated in band-shaped regions to form bonding parts. Therefore, the adhesive coating process is simple. Additionally, the adhesive can be coated uniformly.

Because the bonding parts bonding sheets together are formed at a given pitch, the softness of the sheet can be procured totally and any pattern of the bonding parts may be readily formed to form the large wrinkles "B" having protrusions and recesses as shown in FIGS. 1 and 2(A).

What is claimed is:

1. A method of producing a wiping sheet comprising the steps of:

drying a first sheet by means of a heating roll such tat the water content of an absorbent fiber contained in the first sheet is 10% by weight or more to 25% by weight or less;

crepe-processing the first sheet by applying a blade to the first heating roll, while transferring the first sheet from the first heating roll to the second heating roll, with a lead-out rate of the first heating roll faster than the lead-in rate of the second heating roll;

further drying the first sheet by means of the second heating roll after being crepe-processed;

coating an adhesive with a viscosity of 200 cps or more to 20,000 cps or less on a second sheet which elongates less than the first sheet when impregnated with a liquid or is not crepe-processed, by using a coater having discharge slits which are in contact with the surface of the second sheet and have an opening dimension of about 1 mm to 3 mm across the lead-out direction to form band-shaped regions of the adhesive which extend in the lead-out direction of the first sheet;

overlaying the first sheet onto the second sheet with the adhesive positioned therebetween and partially pressurizing the first and second sheets by means of a heating emboss roll, such that the individual band-shaped regions are pressurized at intervals in the lead-out direction by corresponding embosses of the heating emboss roll having a larger width dimension in the lead-out direction than that of the band-shaped regions, whereby the first and second sheets are bonded to each other at a plurality of bonding parts which are formed by overlapping the band-shaped regions and the pressurized regions by The embosses of the heating emboss roll and extend in the form of rows in the lead-out direction corresponding to the band-shaped regions; and impregnating at least the first sheet with a liquid and generating large wrinkles on the first sheet due to crepe restoration, the large wrinkle being formed by alternating mountainous zones and valley zones in each region between adjacent rows of the bonding parts, such that a width of the valley zones in the lead-out direction is determined by the dimension of the bonding parts and a dimension of the mountainous zones across the lead-out direction is determined by a distance between adjacent bonding parts in the lead-out direction, whereby small wrinkles as residual crepe wrinkles on the large wrinkles of the first sheet.

2. A method of producing a wiping sheet according to claim 1, wherein the bonded sheets after the pressurizing step are folded and impregnated with a fluid chemical one by one to generate the large wrinkles.

3. A method of producing a wiping sheet according to claim 1, wherein the basis weights of the first and second sheets are 20 g/m² or more to 100 g/m² or less, respectively.

4. The method of producing a wiping sheet according claim 1, wherein each of the embosses of the embossing roll extend obliquely to the lead-out direction.

5. The method of producing a wiping sheet according to claim 1, wherein said impregnating liquid contains at least one metal ion selected from the group consisting of $CaCl_2$, $ZnSO_4$, $MgSO_4$, $Na_2SO_4$, $KCl$ and $K_2SO_4$.

* * * * *